United States Patent
Schneider et al.

[11] Patent Number: 5,929,897
[45] Date of Patent: Jul. 27, 1999

[54] AUTOMATED DISTRIBUTION OF VIDEO TELEPHONE CALLS

[75] Inventors: George E. Schneider, Springboro; James V. Johnson, Kettering, both of Ohio

[73] Assignee: NCR Corporation, Dayton, Ohio

[21] Appl. No.: 08/501,686

[22] Filed: Jul. 12, 1995

[51] Int. Cl.[6] ............................ H04M 11/00; H04N 7/14; H04N 7/15
[52] U.S. Cl. ................................ 348/15; 348/14; 348/16; 379/90.01; 379/93.07; 379/93.12; 379/93.21; 379/265
[58] Field of Search .................................. 379/90, 91, 93, 379/96, 98, 94, 90.01, 91.01, 91.02, 93.01, 93.03–93.05, 93.07, 93.12, 93.17, 93.21, 201–206, 265; 348/13, 14, 15, 16, 17; 395/230, 235, 239, 242, 243; 235/379–383; 902/20, 21; 705/30, 35, 39, 42, 43

[56] References Cited

U.S. PATENT DOCUMENTS

| | | | |
|---|---|---|---|
| 5,042,062 | 8/1991 | Lee et al. | 379/94 |
| 5,329,572 | 7/1994 | Martens | 348/16 |
| 5,371,534 | 12/1994 | Dagdeviren et al. | |
| 5,482,139 | 1/1996 | Rivalto | 235/383 |
| 5,557,667 | 9/1996 | Bruno et al. | 379/96 |
| 5,585,839 | 12/1996 | Ishida et al. | 348/16 |
| 5,604,341 | 2/1997 | Grossi et al. | 235/379 |
| 5,606,496 | 2/1997 | D'Agostino | 395/235 |
| 5,654,961 | 8/1997 | Araujo et al. | 379/202 |
| 5,717,857 | 2/1998 | Burkman et al. | 379/202 |

*Primary Examiner*—Stella Woo
*Attorney, Agent, or Firm*—Gregory A. Welte

[57] ABSTRACT

The invention concerns establishing a video conference between a remote station, such as an Automated Teller Machine (ATM), and a central facility, such as a bank. At the bank, multiple AGENTs are available to handle incoming calls.

These AGENTs receive incoming calls (which are non-video calls) through Automated Call Distribution equipment (ACD), known in the art. The ACD receives an incoming (non-video) call (from ATMs and other sources), locates a free AGENT, and delivers the incoming call to the free AGENT.

Under the invention, an ATM places an ordinary telephone call to the ACD, which routes the call to the computer of a free AGENT. The call delivers a message requesting a video conference, and identifies the calling ATM. The free AGENT's computer then calls the ATM, via a high-bandwidth telephone channel, such as ISDN, and establishes the video conference.

18 Claims, 8 Drawing Sheets

AUTOMATED DISTRIBUTION OF VIDEO TELEPHONE CALLS

The invention concerns receiving a video conference call, locating a free AGENT to accept the call, and routing the call to the free AGENT.

BACKGROUND OF THE INVENTION

Automated Call Distribution

Figure 1:
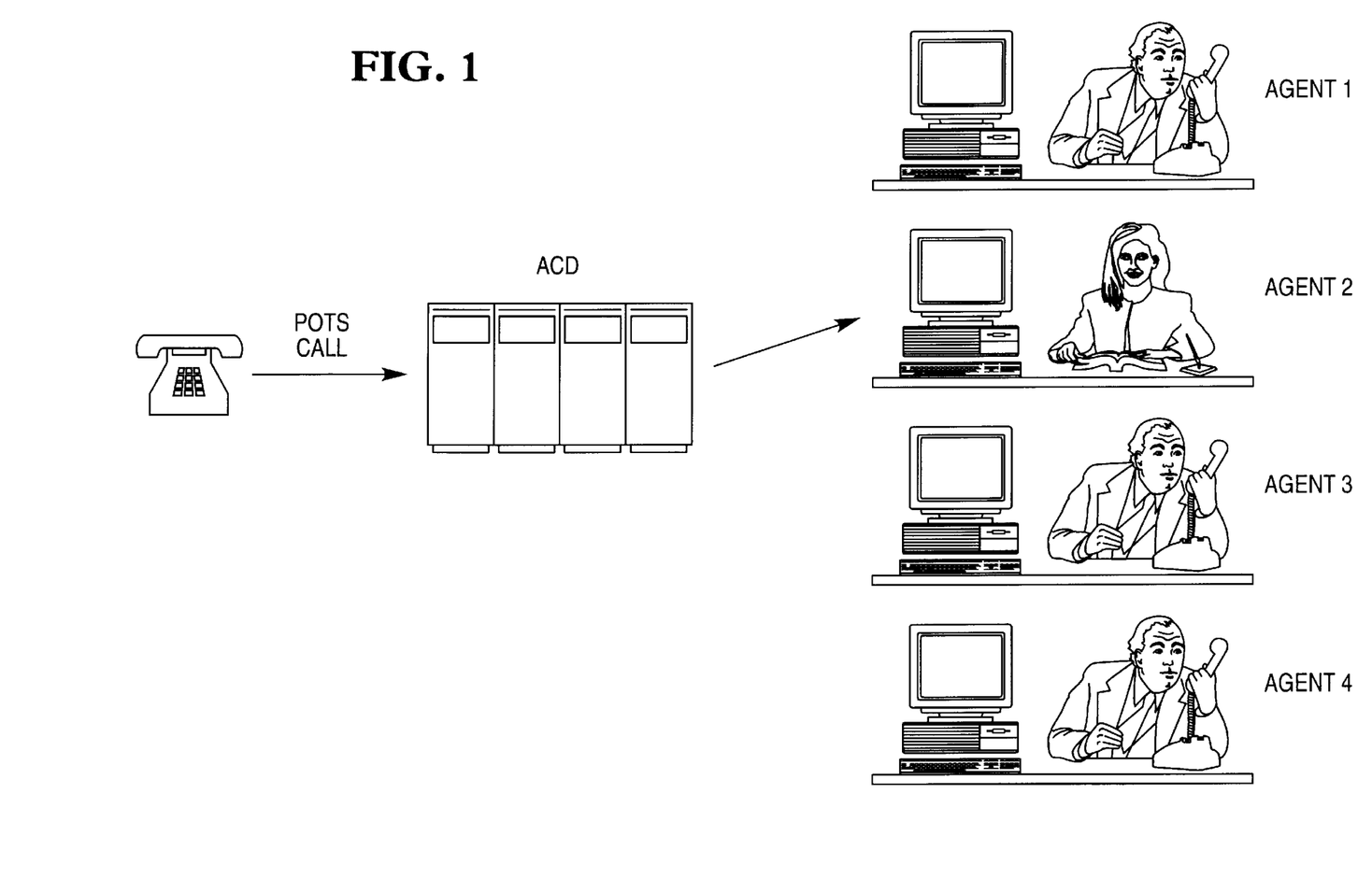
FIG. 1 illustrates a prior-art Automated Call Distribution (ACD) system.

Automated Call Distribution (ACD) systems are well known. ACDs are used, for example, by mail-order retailing firms, which accept telephone orders for merchandise from customers. An ACD is shown in FIG. 1. As the ACD receives each incoming call from a customer, it searches for a free AGENT, to take the customer's call. When a free AGENT is found, the ACD connects the incoming call with the free AGENT.

In the example of FIG. 1, the incoming call is routed to AGENT 2, as indicated by the arrow. The call is not routed to any of the other AGENTs, because they are busy with other telephone calls.

This activity of the ACD is commonly called "hunting" and "distributing."

ACDs Cannot Handle Video Conferencing Calls

The call illustrated in FIG. 1 is an ordinary POTS call. "POTS" is an acronym used in the telephone industry, and stands for Plain Old Telephone Service. Residences are typically provided with POTS service. The amount of information which a POTS call can carry is limited, because of the limited bandwidth of a typical POTS line.

Today, another type of call, namely, the video conferencing call, or video call, is coming into widespread usage. In a video call, a video image of the caller is transmitted, in addition to the caller's voice. The parties to the call can both see, and hear, each other. Video calls require a significantly larger bandwidth than POTS provides. Video calls typically do not use POTS lines.

For technical reasons which need not be elaborated here, presently available ACDs cannot, in general, distribute video calls. That is, the ACDs cannot search for a free AGENT, as in FIG. 1, and route a video call to the free AGENT.

OBJECTS OF THE INVENTION

An object of the invention is to provide an improved ACD.

A further object of the invention is to provide distribution of video-conferencing calls.

SUMMARY OF THE INVENTION

In one form of the invention, a person, located at an Automated Teller Machine (ATM), requests a video conference with a representative of the bank which operates the ATM.

The ATM places a POTS call to an ACD which services the bank. The ACD locates a free representative. Then, the ATM delivers a message to the representative's video conferencing system, via the POTS call, which (a) identifies the ATM and (b) requests that the representative establish a video conference with the ATM.

In response, the representative's computer calls the ATM, via a high-bandwidth, non-POTS, telephone channel, and establishes a video conference. After the video conference is established, the POTS call may be maintained, though not used, for reasons explained herein.

DETAILED DESCRIPTION OF THE INVENTION

Figure 2:
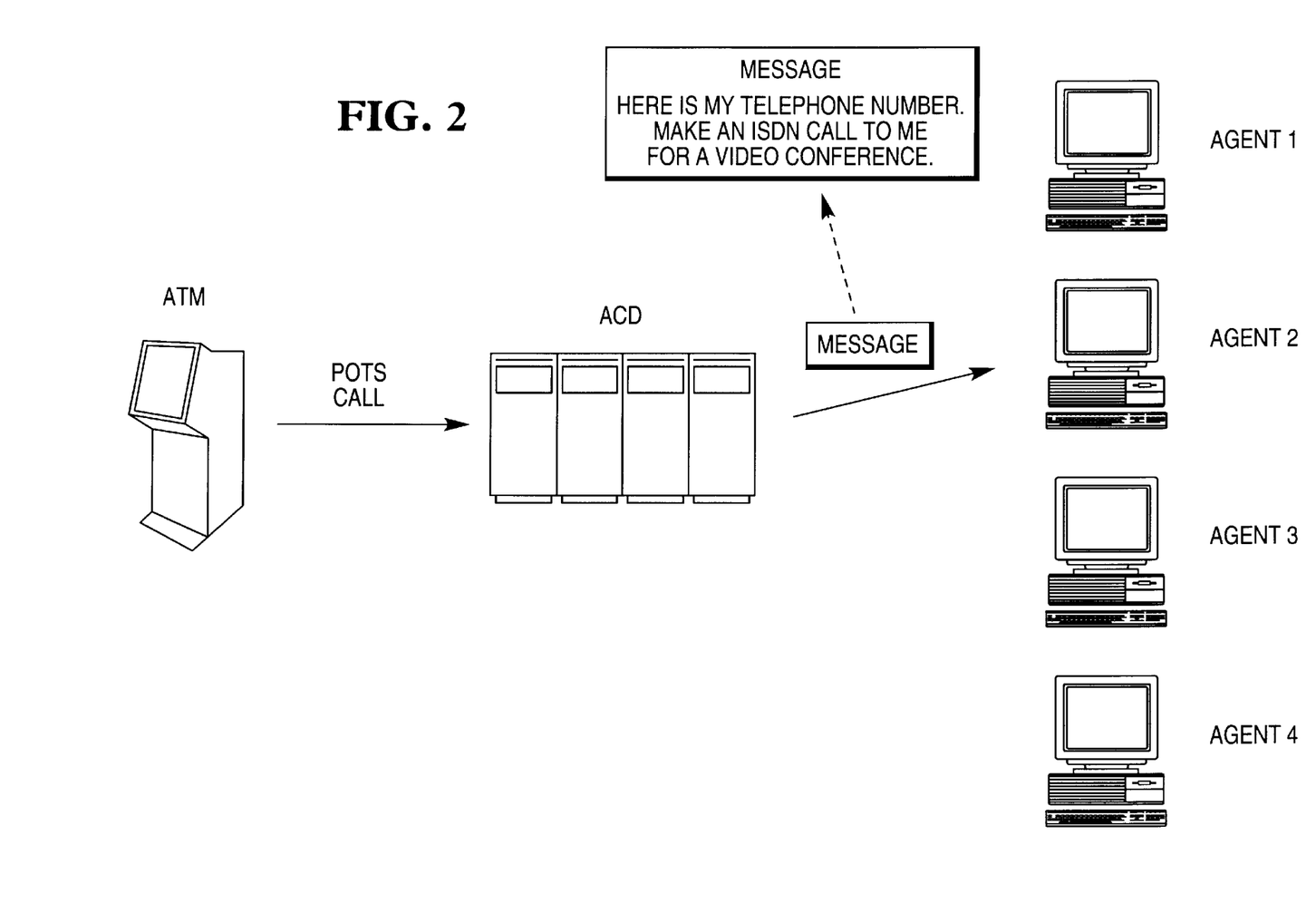
FIG. 2 illustrates one form of the invention.

FIG. 2 illustrates an Automated Teller Machine (ATM) which is outfitted with equipment which allows the ATM to hold video conferences with remote parties. Some of this equipment is described near the end of this Detailed Description.

ATMs allow customers to execute banking transactions. During a transaction, a customer may wish to request assistance from a banking expert, and may wish to establish a video conference with the expert.

PROGRAM Creates Data Link and Sends Message

Figure 3:
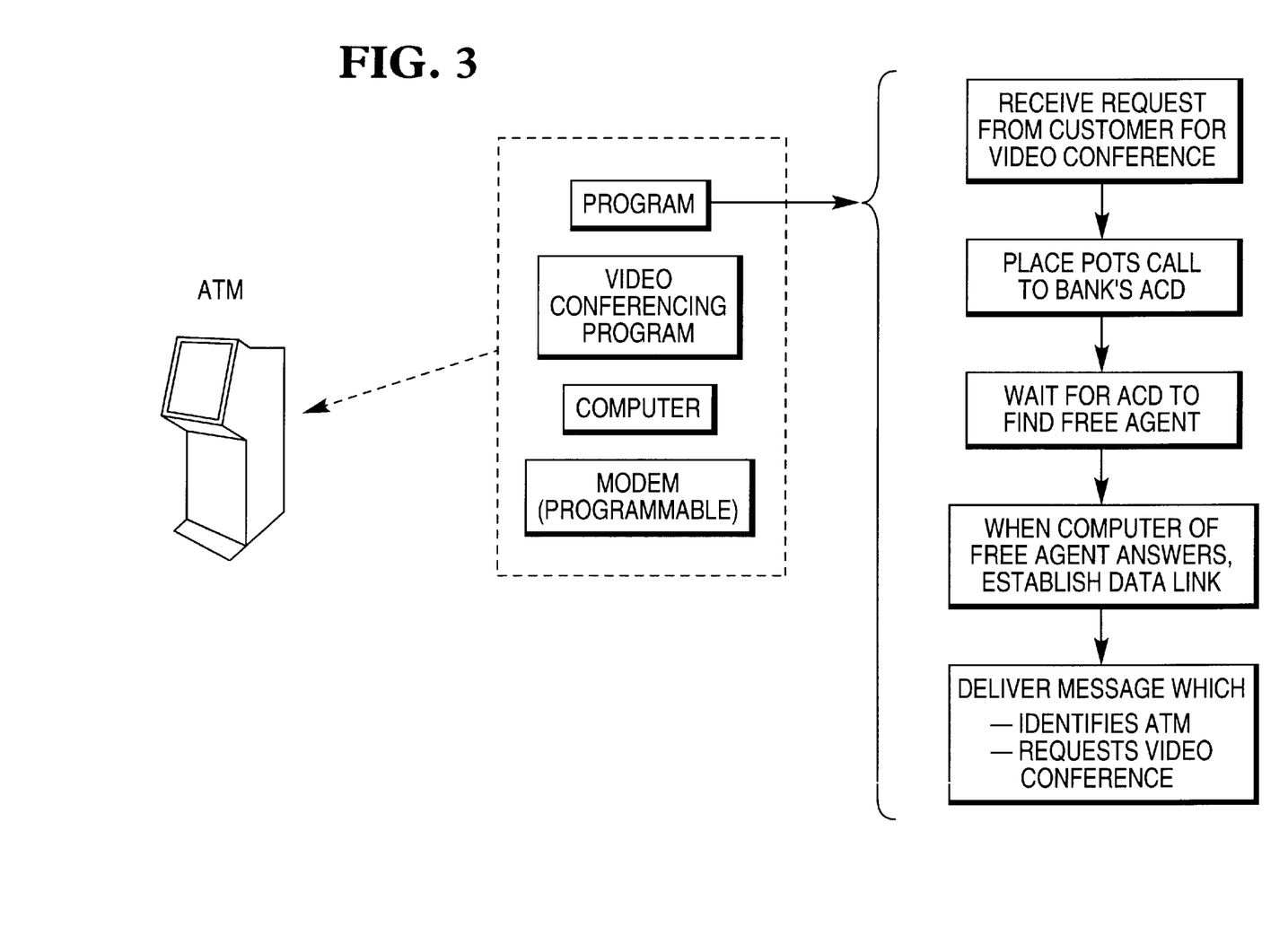
FIG. 3 illustrates components which are contained within the ATM of FIG. 2, and a flow chart illustrating logic executed by the PROGRAM.

When the customer requests a video conference, a PROGRAM, shown in FIG. 3, is executed. This PROGRAM runs on a computer contained within the ATM. This PROGRAM places a POTS data call (as opposed to a POTS voice call) to the bank, as indicated by the flow chart in FIG. 3. (The ATM thus acts as the initiating station for a video conference.)

This POTS call is received by an ACD servicing the bank, as indicated by the arrow in FIG. 2, and, in the usual manner, the ACD locates a free AGENT, which is AGENT 2 in this example. Then, having located the free AGENT, the ACD directs the POTS data call to the free AGENT's computer, as indicated. (In contrast, the ACD of FIG. 1 directs the call to the free AGENT's telephone, not to a computer.) The POTS call contains a MESSAGE for the free AGENT.

For the MESSAGE to be delivered, a data link must be established between the ATM and the free AGENT's computer. Programmable modems establish the data link. One modem is located at the ATM, and another is located at the free AGENT's computer. For the data link to be established, both modems must agree on parameters which include the following:

baud rate (e.g., 1200, 2400),
number of data bits per frame (e.g., 8 or 7),
type of parity (e.g., even, odd, or none), and
number of stop bits (e.g., 1, 1.5, or 2).

These parameters, and other information, are exchanged between the two modems, according to the programming of the modems.

Programmable modems are known in the art. One type is model PM 14400 FX V.32 bis, available from Practical Peripherals, located in Thousand Oaks, Calif. Programming such modems, to automatically establish a data link, in order to deliver the MESSAGE, is also known in the art.

A key feature of the programmable modems is that no human intervention, or insignificant human intervention, is required to either set up the data link, or deliver the MESSAGE to the free AGENT's computer.

Eliminating human intervention is within the skill of the art. By analogy, facsimile (FAX) machines accomplish a very similar task, without human intervention. FAX machines can be pre-programmed with frequently called telephone numbers. To send a FAX, a person selects one of the pre-programmed numbers, analogous to a person requesting a video conference in FIG. 2.

The FAX machine dials the number, and establishes a data link with another FAX machine, without further human intervention.

Content of Message

The MESSAGE of FIG. 2 (a) requests the free AGENT's computer to place a video conferencing call to the ATM and (b) provides the free AGENT's computer with the telephone number to call.

As to providing the telephone number, the ATM can include the actual telephone number within the MESSAGE. Alternately, the ATM can identify itself by a code. The free AGENT's computer maintains a table which associates a telephone number with each code. The free AGENT's computer looks up the telephone number in the table.

Free AGENT's Computer Makes Video Conferencing Call

Figure 4:
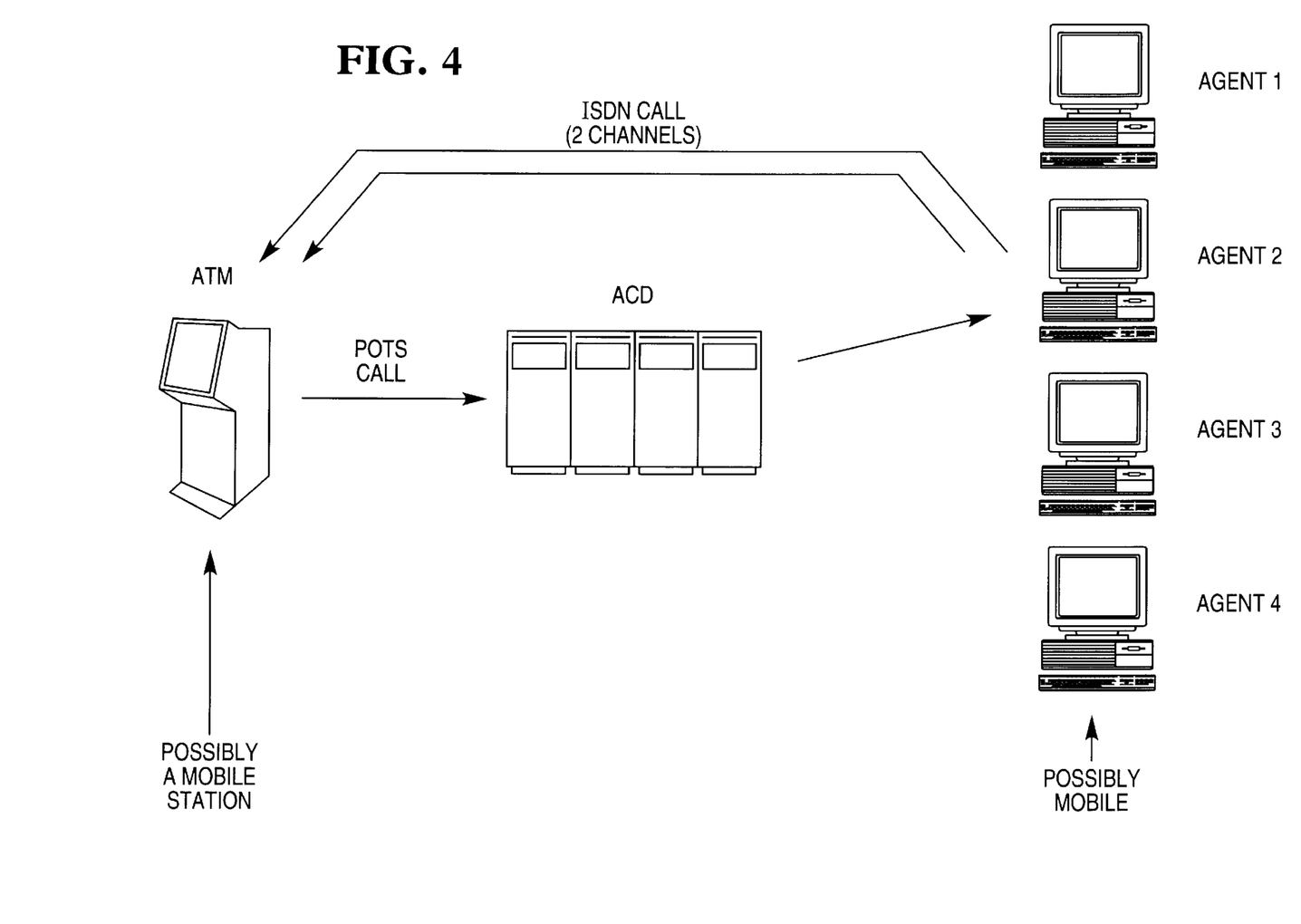
FIG. 4 illustrates establishment of an ISDN call by a free AGENT.

The free AGENT's computer then places the video conferencing call to the ATM, as indicated in FIG. 4.

The video call is placed over a high-bandwidth telephone channel, such as commercially available ISDN. The video conferencing call is not placed over a POTS line.

Commercially available systems, such as VISTIUM, available from AT & T Global Information Solutions Company, Naperville, Ill., provide the ability to hold such conferences. In the present context, the VISTIUM system located at the ATM in FIG. 2 (and indicated by the block VIDEO CONFERENCING PROGRAM in FIG. 3) is placed into "auto-answer" mode, for answering the call made by the free AGENT's computer, and establishing the video conference.

Initial POTS Call is Maintained

During the video conference, the initial call, made over the POTS line, can be maintained, and not terminated. There are two primary reasons for maintaining this POTS call.

Maintaining POTS Call Indicates that AGENT is Busy

One reason is that, once the video conference begins, the formerly free AGENT now becomes occupied, and is no longer free. Subsequent incoming calls from other customers should not be routed to this AGENT by the ACD during this time.

Maintaining the initial POTS call, even though no information is transferred, acts as a signal to the ACD that the AGENT is not free. Restated, maintaining the POTS call, though idle, gives a "busy" signal to the ACD.

ACD Monitors POTS Calls

A second reason is that monitoring equipment is used, either as part of the ACD, or in adjunct to the ACD. This equipment monitors the calls taken by the AGENTs. For example, the equipment can log each call taken by an AGENT, as to duration and time of occurrence, and thereby provide a record of each AGENT's daily telephone activity.

If the initiating POTS call were terminated after the video conference were established, then the monitoring equipment would obtain information which is not useful. That is, for each video conference established, the monitoring equipment would detect a very short POTS call handled by an AGENT, but would not detect the subsequent video conference. A log of such short POTS calls would provide information which is non-useful, and possibly misleading.

Therefore, the POTS call is maintained in order to support the call logging and reporting system associated with the ACD.

Alternate Perspective

From another perspective, the justifications for maintaining the POTS call result from the fact that a different system is used for the incoming POTS call, as compared with the video conferencing call. These two systems are, in general, independent, and do not communicate with each other.

Maintaining the POTS call allows the logging function to continue, unimpeded by the video conferencing.

Additional Perspective

The invention allows the function of hunting, and distribution, of video calls to be retro-fitted to a pre-existing ACD. The invention does not interfere with the call distribution activity of the ACD. Further, the invention allows the pre-existing call logging equipment of the ACD to also log the video calls.

In logging the video calls, the invention can detect and log when an AGENT makes a video call (by detecting when the AGENT makes a high-bandwidth outgoing call). The invention can also detect the combination of (i) receipt of a MESSAGE and (ii) making of a video call. Detection of either making a video call, or the combination receipt of the MESSAGE and making of a video call, indicates that a video call is occurring. Again, as stated above, the incoming POTS call, which solicited the video call, is maintained while the video call occurs.

Recapitulation

The invention undertakes the following steps.

1. The customer of the ATM requests a video conference with a representative of the bank.

2. A computer located at the ATM makes a POTS data call (as opposed to a POTS voice call) to the bank, which is received by an ACD. The ACD locates a free AGENT, and directs the POTS call to the free AGENT's computer.

3. The POTS call delivers a MESSAGE which (a) requests the free AGENT to make a video conferencing call to the ATM, and (b) provides a telephone number for the free AGENT to call.

4. The free AGENT's computer calls the number provided by the message, and establishes a video conference.

5. The initial POTS call may be maintained with the free AGENT.

Additional Considerations

1. It is not necessary that the free AGENT's computer make the video conferencing call automatically, in response to the MESSAGE. Instead, the free AGENT's computer can receive the MESSAGE, and indicate, to the free AGENT, that a request for a video conference has been received. The free AGENT can then decide whether to make the video call, in a usual manner.

2. It may be thought that one result of the invention, namely, locating a free AGENT and establishing a video conference, can be accomplished by another approach. The other approach is to equip every AGENT with an ISDN line which is available to incoming video calls. Under this approach, the ATM would place a succession of ISDN calls to a succession of AGENTs, until a free AGENT is found.

However, this approach has a significant disadvantage: in making a video call, the caller does not immediately learn whether the AGENT called is free. Preliminary matters, relevant to setting up the video call, must first be undertaken by the two computers involved. The set-up time for each call takes about ten or fifteen seconds.

Thus, calling five AGENTs, in order to locate a free one, will require about 50 to 75 seconds. This consumption of time is considered undesirable. Further, the telephone service required to make these calls, such as ISDN, is significantly more expensive than POTS service.

3. One characterization of the invention is that it allows a remote party to request that a free AGENT be found, and that a video call be established between the remote party and the free AGENT. Devices, other than ACDs, can be developed to accomplish this procedure. The invention does not strictly require an ACD.

Figure 5:
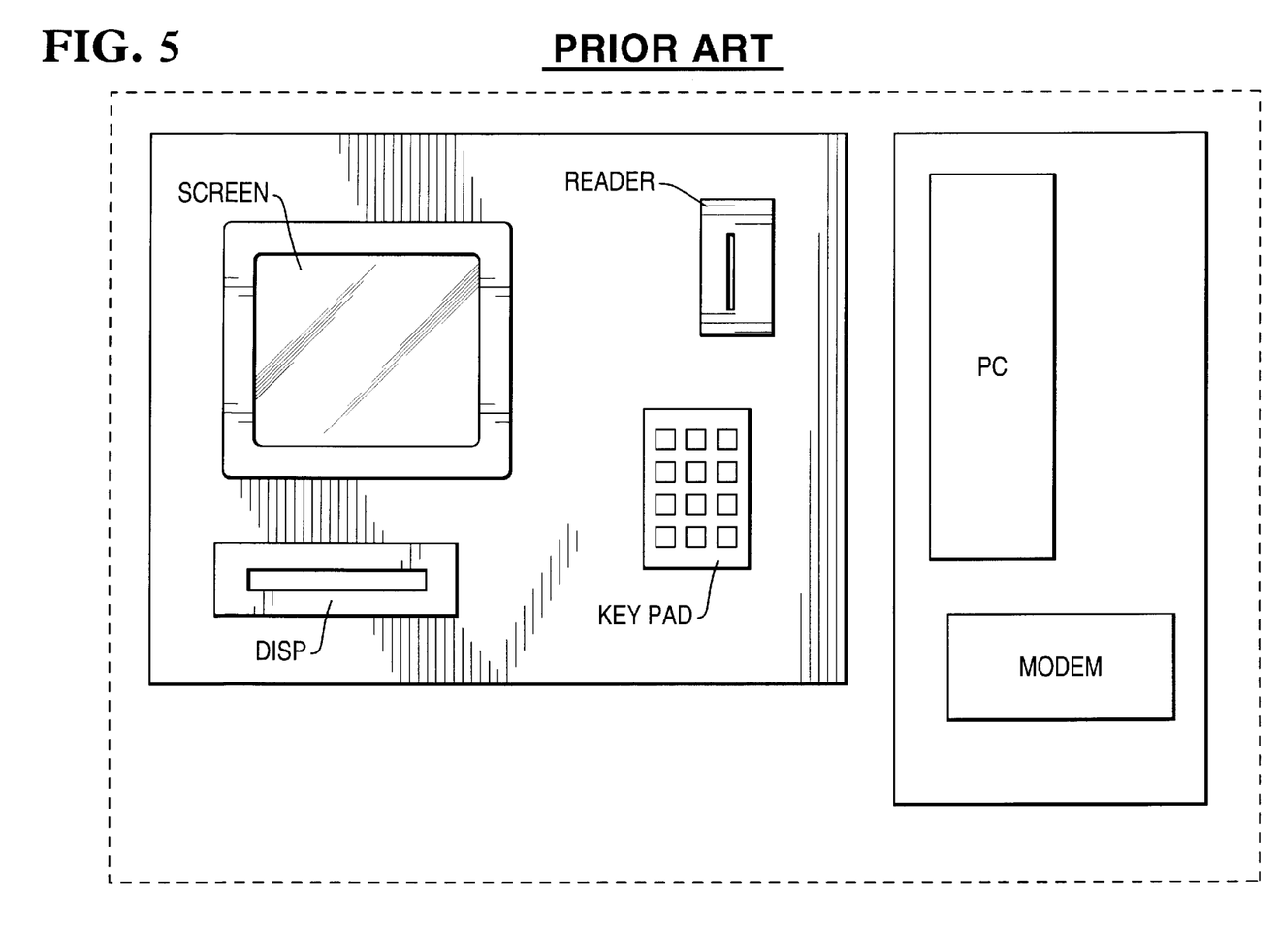
FIG. 5 illustrates components associated with a prior art Automated Teller Machine, ATM.

4. As stated above, one of the STATIONs can be located at an Automated Teller Machine, ATM. FIG. 5 illustrates, in schematic form, some of the equipment contained in a prior-art ATM. The equipment includes a Personal Computer (PC) and a MODEM. The latter allows the PC to communicate with the financial institution which owns the ATM.

The equipment also includes the following:

A magnetic card READER, which reads an identification card presented by a user of the ATM.

A keypad, labeled KEYP, which allows a user to enter data.

A dispenser, labeled DISP, which dispenses currency to the customer.

A video display, labeled SCREEN, which allows the PC to display information to the customer.

Figure 6:
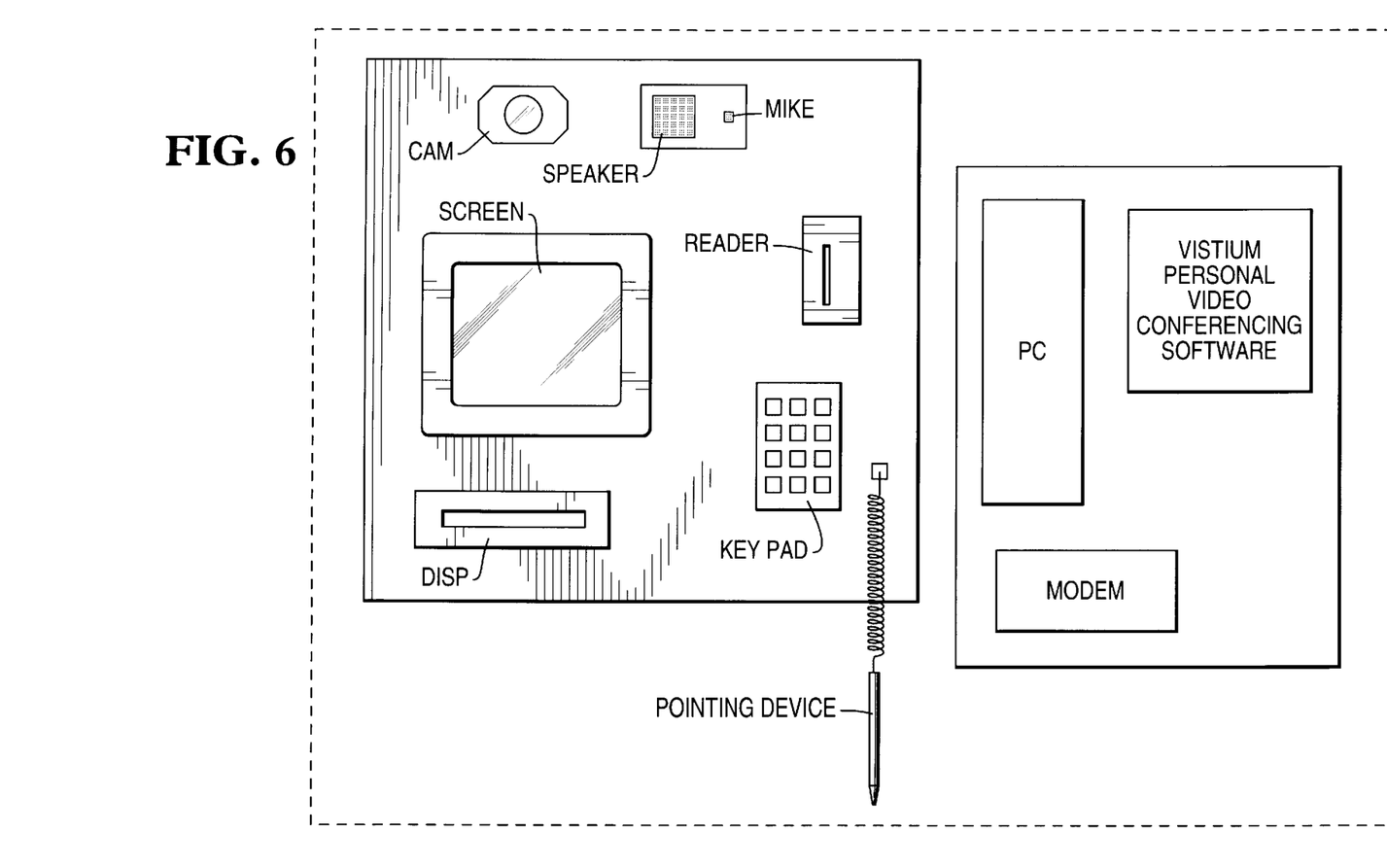
FIG. 6 illustrates components which allow an ATM to undertake video conferencing.
Figure 7:
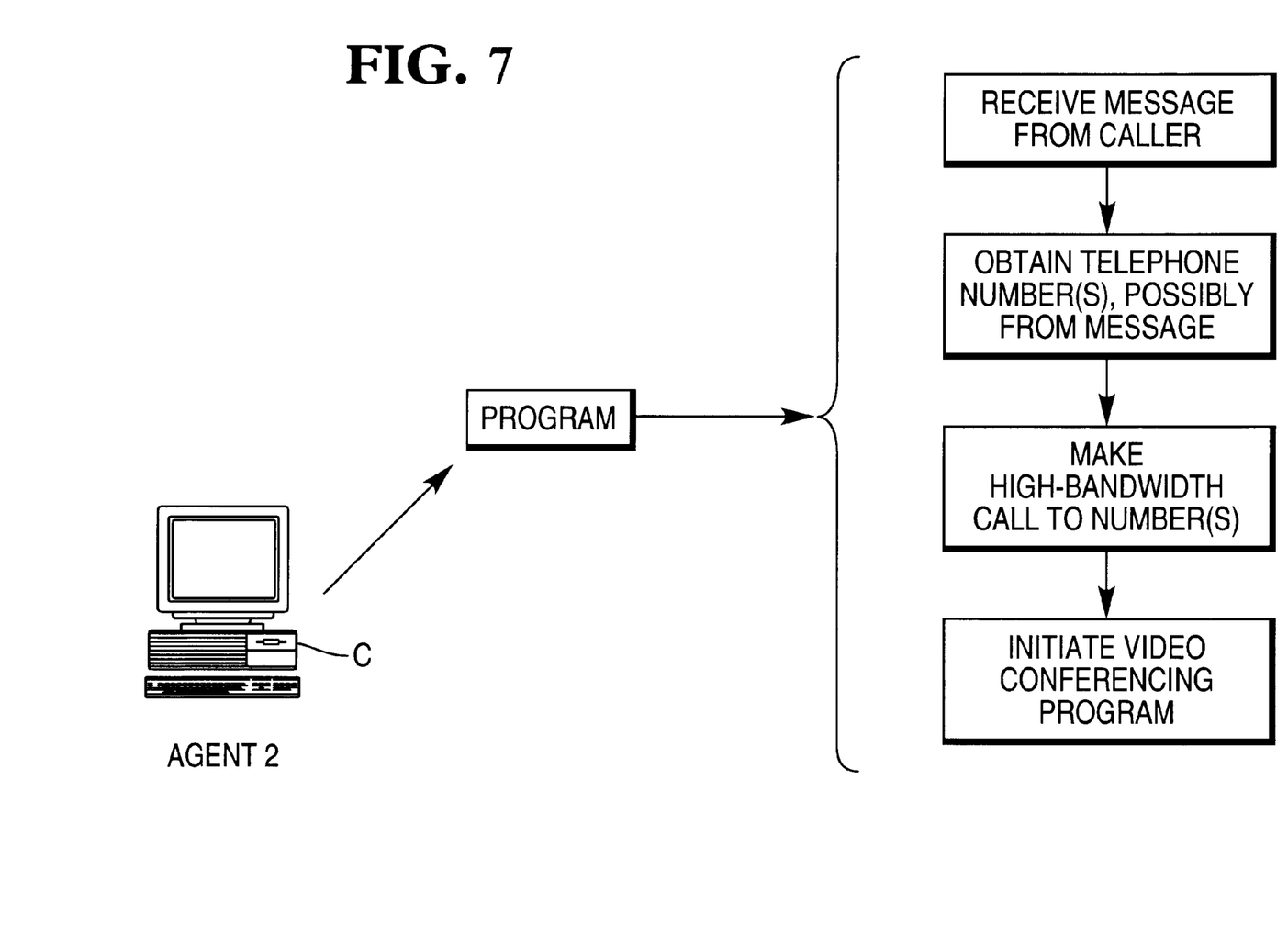
FIG. 7 illustrates a PROGRAM, and a flow chart outlining its logic, which is resident on the computer of each AGENT.
Figure 8:
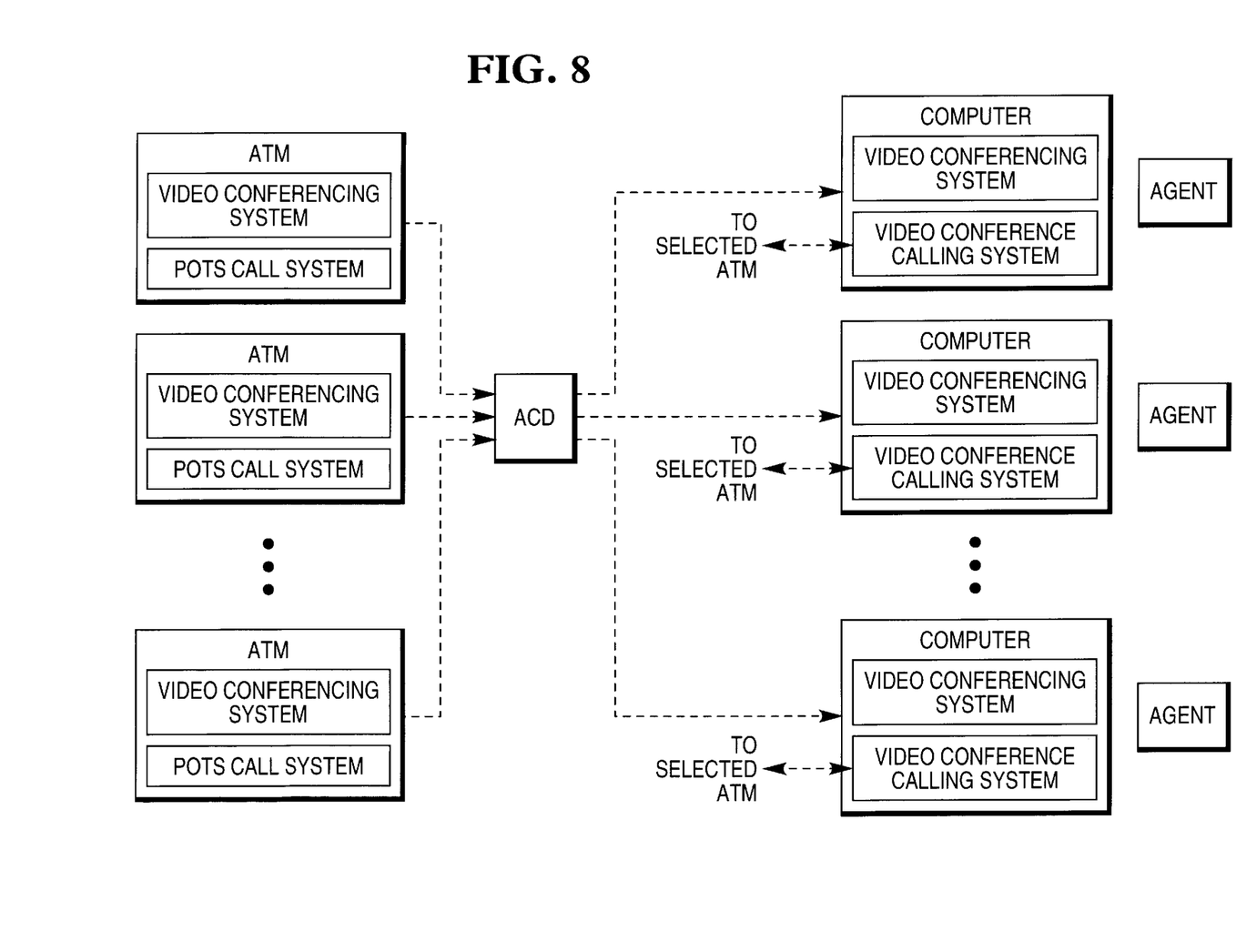
FIG. 8 illustrates one form of the invention.

One form of the invention adds the equipment shown in FIG. 6. This added equipment includes the following:

A video camera, labeled CAM.

An audio speaker, labeled SPKR.

An audio microphone, labeled MIKE. The speaker and microphone can be consolidated into a telephone handset.

A POINTING DEVICE, such as a light pen, pen-type trackball, or mouse.

VISTIUM PERSONAL VIDEO CONFERENCING SOFTWARE, which is a commercially available product, which can be purchased from AT & T Global Information Solutions Company, Naperville, Ill. An early version of this product was designated "Telemedia Connection."

The keypad KEYP need not be discrete component, but can be integrated into the display DISP, by using a touch-sensitive screen within the display.

This equipment allows a user of the ATM to establish a video conference with another video conferencing station. In a video conference, each party can speak to, and hear, the other, by means of the speaker SPKR and microphone MIKE in FIG. 6. Also, each party can see, on the SCREEN, the image which is captured by the camera CAM of the other party. This image can include the face of the other party, or an object, such as a document, which the other party presents to the camera CAM.

5. When a customer executes a transaction, such as a cash withdrawal, from a prior-art ATM, the ATM contacts the customer's bank, in order to obtain the customer's financial data. However, this contact is made via a dedicated telephone line, and not by an ordinary telephone line.

The dedication feature of the line restricts the ATM to calling only selected telephone numbers, and also allows only selected numbers to call the ATM. The dedication feature is used for security purposes.

In contrast, the POTS call made by the invention uses a telephone line which is separate from this dedicated line. This POTS line can, itself, be dedicated (it can allow calls only to the bank), or it can be a general-purpose POTS line (allowing calls to any destination).

In addition, a high-bandwidth telephone channel, such as ISDN service, is made available to the ATM, for the video conferencing calls. Consequently, three telephone channels are available to the computer of the ATM:

(1) the dedicated line, (2) the POTS line, and (3) the high-bandwidth channel.

6. An ISDN data link typically uses two physical transmission lines, each capable of carrying about 64,000 bits per second. Two lines provide transmission in two directions.

The maximum data rate allowable on a POTS line is about 30,000 bits per second.

7. The term "bank" was used above, but as a term representing financial institutions generally. Of course, the remote station indicated by the ATM in FIG. 2 need not be an ATM, nor is it required that the video conference be held with a bank. The invention covers the generic concept of (a) delivering a MESSAGE which requests a video conference and (b), in response to the message, making a high-bandwidth video call to the party sending the message.

8. The scenario described above considered a video conference between an ATM and a bank. However, in the general case, the invention concerns (a) making an initial POTS call to an ACD, in order to (b) locate a free AGENT, followed by (c) requesting that the free AGENT (or the AGENT's computer) return the call, but in the form of a video conference call. In addition, the initial POTS call can be maintained throughout the video conference, for various purposes.

9. The term "high bandwidth" can be defined as a bandwidth capable of more than 64,000 bits per second. Another definition is a bandwidth sufficient to support full-motion video.

10. For ease of explanation, the description of the invention given above was framed in terms of a customer of a bank, seeking a video conference from an ATM. However, the invention is not limited to this context.

The invention can be used in any situation where video conference calls are received, and where hunting is done to locate a free AGENT. Some exemplary organizations which are expected to use the invention are the following:

organizations which sell airline tickets, and tickets to entertainment events, such as sporting events and musical concerts;

hotel reservation systems;

telephone retailing concerns; and any organization which currently uses an ACD, or equivalent.

11. The discussion above stated that the ATM passes a MESSAGE (see FIG. 2) which identifies the ATM's telephone number. Two variants of this procedure are possible. One is that the ATM need not actually pass its own telephone number in the MESSAGE. Instead, a service called "Automatic Number Identification", or ANI, can be used.

Under this service, the telephone company passes the telephone number to the recipient of a telephone call, when a caller calls the recipient. This passed number is used by equipment sold under the generic label "Caller Identification," or Caller ID. This equipment displays the number of the calling party to the recipient.

The invention may, in some cases, obtain the telephone number of the ATM from the service ANI.

A second variant is that more than a single telephone number may be required to place a video conference call to the ATM. In such a case, of course, the proper numbers are passed to the free AGENT, whether they be one or several.

12. The discussion above assumed that a customer of an ATM requested a video conference call. The invention is not limited to video conferences made with an ATM. The invention covers requests for video conferences made by any calling station. Calling stations will come into widespread use, in the form of public-access telephones having video conferencing capability.

The video conference need not be made with a public station, such as an ATM or calling station. The video conference can be established with any system having video conferencing capability, such as a multi-media personal computer, properly equipped.

13. The term "station" does not necessarily refer to a video conferencing device which is "stationary." The term "station," in its historical origins, perhaps did refer to stationary facilities, such as radio "stations."

However, under the invention, a "station" can be mobile. This usage is consistent with common understanding. The radio "shack" in a ship is called a "station," even though the shack is mobile.

14. The discussion above perhaps implied that the AGENTs of the bank were located together, in a common set of offices. However, this common location is not necessary. The AGENTs can be located at different locations, provided that they have access to a communication link which will support a video conference call.

For example, the AGENTs can work from their homes. The ACD routes incoming POTS calls to the AGENTs' homes. The AGENTs' computers make return video conference calls to the requester of the video conference, as described above.

When wide-band wireless telephone becomes available, such telephones can be used to support the video conference call. Such telephones would allow the AGENTs to be mobile. Thus, a mobile requester can request a video conference call. An ACD routes the request to a free AGENT, who is also mobile, who makes a return video conference call.

15. The discussion above described POTS calls. POTS refers to a common telephone call. Another name for a POTS call is a PSTN (Public Service Telephone Network) call.

As technology advances, it can be expected that the bandwidth of common telephone calls will increase. Thus, it is not required that the MESSAGE of FIG. 2 be delivered by a low-bandwidth call. But, in one form of the invention, it is important that the call which requests the video conference be distributable through an ACD.

16. An important feature of the invention is the delivery of a MESSAGE which solicits the return of a return video conferencing call. (See FIG. 2.) The medium which carries the MESSAGE is not necessarily significant, provided that the MESSAGE be delivered promptly (in the range of five or ten seconds, or so). Also, preferably, the service which delivers the MESSAGE should do so at an inexpensive cost, such as that of an ordinary telephone call.

17. Some of the concepts discussed herein should not be confused with ordinary telephone messaging systems, such as "voice mail." For example, the MESSAGE of FIG. 2 is not analogous to an audio telephone message which a person leaves on a telephone answering machine. The MESSAGE of FIG. 2 contains digital data, which is unintelligible to the human ear.

Further, the MESSAGE of FIG. 2 can be extremely short, and is also unintelligible to the human ear for that reason. For example, the MESSAGE can contain two pieces of information: (a) a request for a conference, and (b) a telephone number. Different approaches will deliver this information in different numbers of bytes, but a reasonable approximation is that the MESSAGE can require ten or twenty bytes (or so). This number of bytes can be transmitted in a fraction of a second, which is too short a time for a human to perceive the information, even if it were in human-intelligible form.

18. In general, a device which is capable of holding video conferences is also capable of making, and receiving, ordinary telephone calls.

Numerous substitutions and modifications can be undertaken without departing from the true spirit and scope of the invention. What is desired to be secured by Letters Patent is the invention as defined in the following claims.

We claim:

1. A method of communicating between first and second parties, comprising the following steps:
 a) initiating a POTS call from the first party to the second;
 b) delivering, to the second party via the POTS call, a MESSAGE which requests a video conference and then terminating the POTS call, and
 c) in response to the message, and after termination of the POTS call, making a high-bandwidth video call from the second party to the first party.

2. A method of establishing a video conference, comprising the following steps:
 a) from a device capable of holding a video conference, making a call to an ACD, which ACD
  i) hunts for a free AGENT; and
  ii) when a free AGENT is found, directs the call to a computer associated with the free AGENT;
 b) delivering a message to said computer, which requests a video conference; and
 c) causing said computer to initiate establishment of a video conference with said device.

3. A method of establishing a video conference between (1) a facility which maintains multiple AGENTs who respond to incoming calls and (2) an ATM, comprising the following steps:
 a) sending, via a POTS call, a request for a video conference from the ATM to the facility, which request contains a telephone number by which the ATM can be reached;
 b) locating a free AGENT at the facility;
 c) delivering the request to a computer controlled by the free AGENT;
 d) terminating the POTS call; and
 e) placing a high-bandwidth call from the computer to the ATM, to thereby establish a video conference between the free AGENT and the ATM.

4. A method of requesting establishment of a video conference, comprising the following steps:
 a) sending, from a first station, via a POTS call, a message to a computer which will act as a video conferencing station in said video conference, which message
  i) specifies a telephone number of the first station; and
  ii) requests that the computer place calls to establish a video conference with the first station; and
 b) terminating the POTS call, prior to establishment of the video conference.

5. In an ATM, the improvement comprising:
 a) means for transmitting a non-human-intelligible message from the ATM to a remote computer, which induces the remote computer without human intervention to initiate establishment of a video conference with the ATM.

6. A method of responding to telephone calls, comprising the following steps:
 a) receiving a POTS call, hunting for a free AGENT, and delivering the POTS call to said free AGENT;

b) deriving identity of a remote station from the POTS call; and c) establishing a video conference with said remote station.

7. The method according to claim 6, and further comprising the step of maintaining the POTS call during the video conference.

8. A system comprising:

a) multiple computers, each for serving an AGENT;

b) means for receiving a request for a video conference from a remote computer via a POTS call and, in response,
   i) locating an available AGENT; and
   ii) establishing a video conference independent of the POTS call between the available AGENT and the remote computer, without human intervention.

9. A banking system, comprising:

a) multiple ATMs, each equipped with
   i) video conferencing capability; and
   ii) means for making a POTS call, and transmitting a telephone number via the POTS call;

b) multiple computers, each for serving a respective AGENT;

c) an ACD for
   i) receiving an incoming POTS call from an ATM;
   ii) locating a free AGENT;
   iii) directing the incoming POTS call to the free AGENT's computer;

d) means for deriving the ATM's telephone number from the incoming call; and e) means for causing the free AGENT's computer to call the telephone number, and establish a video conference with the calling ATM.

10. A system according to claim 9, in which the POTS call is maintained during the video conference.

11. In an Automated Teller Machine, ATM, the improvement comprising:

a) a dedicated telephone line, for use by the ATM in obtaining financial information about customers;

b) a telephone line for placing POTs calls;

c) a high-bandwidth channel, for holding video conferences.

12. In a system which includes an ACD, the improvement comprising the following steps:

a) in response to an incoming call from a caller,
   i) locating a free AGENT, and
   ii) establishing a video conference between the free AGENT and the caller independent of the incoming call;

b) maintaining the incoming call during the video conference; and c) logging the time of occurrence, and the duration of the incoming call.

13. A system, comprising:

a) multiple computers, each equipped with means for establishing a video conference, in response to a request made by a remote party;

b) ACD means for
   i) receiving a request for a video conference via a POTS data call; and
   ii) directing the request to one of the computers and c) means for causing the computer, to which the request was directed, to establish a video conference with the remote party, independent of the POTS call.

14. A system according to claim 13, in which the multiple computers are located at different sites.

15. In a microcomputer, the improvement comprising:

a) means for receiving a request for a video conference from a caller; and b) means for placing a high-bandwidth call, without human intervention, to the caller, in response to the request.

16. A method of communicating between two parties, comprising the following steps:

a) establishing a first communication link between the parties, which link comprises a POTS data call, by which a data message is sent asking one party to establish with the other party a second link, which comprises a high-bandwidth channel; and b) maintaining the first link in idle condition, while the high-bandwidth channel is used, wherein
   i) the message is non-intelligible to humans
   ii) the message includes a telephone number, and
   ii) the second party calls this number.

17. The method according to claim 16, and further comprising the step of logging the time of occurrence, and duration, of the first link.

18. In a device capable of holding a video conference, the improvement comprising the following steps:

a) without human involvement, receiving a telephone call from a station which requests a video conference;

b) without human involvement, obtaining a telephone number of the station from a third party; and c) without human involvement, establishing a video conference with the station.

\* \* \* \* \*